US006717684B1

(12) United States Patent
Fikes et al.

(10) Patent No.: US 6,717,684 B1
(45) Date of Patent: Apr. 6, 2004

(54) TARGET SCORING SYSTEM

(75) Inventors: Joseph W. Fikes, Huntsville, AL (US); Anthony F. Zwilling, Huntsville, AL (US); Christopher S. Anderson, Niceville, FL (US); Michael C. Zari, Huntsville, AL (US)

(73) Assignee: Dynetics, Inc., Huntsville, AL (US)

( * ) Notice: Subject to any disclaimer, the term of this patent is extended or adjusted under 35 U.S.C. 154(b) by 297 days.

(21) Appl. No.: 09/590,919

(22) Filed: Jun. 9, 2000

(51) Int. Cl.[7] ............................................. G01B 11/14
(52) U.S. Cl. ...................... 356/614; 356/621; 273/371; 250/221
(58) Field of Search ................................ 250/221, 229, 250/206.1; 356/614, 615, 622, 623, 4.08, 3.16, 141.3, 141.4; 273/348, 317, 371, 378, 382, 358, 366; 434/20–23, 16; 178/6.8, DIG. 20, DIG. 36

(56) References Cited

U.S. PATENT DOCUMENTS

| | | | |
|---|---|---|---|
| 3,788,748 A | 1/1974 | Knight et al. | |
| 3,793,481 A | 2/1974 | Ripley et al. | |
| 3,807,858 A | 4/1974 | Finch | |
| 4,222,564 A | 9/1980 | Allen et al. | |
| 4,281,239 A | 7/1981 | Coon et al. | |
| 4,507,557 A | * 3/1985 | Tsikos | 250/341 |
| 4,936,683 A | * 6/1990 | Purcell | 356/152 |
| 4,949,972 A | 8/1990 | Goodwin et al. | |
| 5,220,409 A | * 6/1993 | Bures | 356/375 |
| 5,577,733 A | 11/1996 | Downing | |
| 5,637,866 A | 6/1997 | Riener et al. | |
| 5,789,739 A | * 8/1998 | Schwarz | 250/22 |
| 5,871,215 A | * 2/1999 | Butts | 273/371 |

* cited by examiner

Primary Examiner—Hoa Q. Pham
(74) Attorney, Agent, or Firm—Needle & Rosenberg, P.C.

(57) ABSTRACT

A device for target scoring includes an elongated retro-reflective member, a first light source, a second light source, a first light sensor, a second light sensor and a processor. The first light source is disposed at a first location and is spaced apart from the retro-reflective member. The first light source is also positioned so as to be able to direct a first beam of light toward the retro-reflective member. The second light source is disposed at a second location spaced apart from both the retro-reflective member and from the first light source. The second light source is also positioned so as to be able to direct a second beam of light toward the retro-reflective member so that the second beam of light intersects the first beam of light over an area so as to define a target area. The first light sensor is disposed adjacent the first light source and is positioned so as to be able to receive light from the first light source that has been reflected from the retro-reflective member. The first light sensor generates a first signal indicative of a first position of a first blockage of illumination from the retro-reflective member. The second light sensor is disposed adjacent the second light source and is positioned so as to be able to receive light from the second light source that has been reflected from the retro-reflective member. The second light sensor generates a second signal indicative of a second position of a second blockage of illumination from the retro-reflective member. The processor is responsive the first signal and to the second signal. The processor is programmed to determine a location of the object in the target area, based on the first position of the first blockage of illumination and the second position of the second blockage of illumination.

3 Claims, 4 Drawing Sheets

TARGET SCORING SYSTEM

BACKGROUND OF THE INVENTION

REFERENCE TO MATERIAL SUBJECT TO COPYRIGHT PROTECTION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

REFERENCE TO A MICROFICHE APPENDIX

A microfiche appendix containing program source code used in one embodiment of the invention schematic diagrams of one embodiment of a circuit employed in data capture is submitted herewith. The microfiche comprises 5 fiches and 267 frames.

1. Field of the Invention

The present invention relates to locating systems and, more specifically, to a system for scoring projectiles fired at a target.

2. Description of the Prior Art

Current small arms scoring systems use various techniques to measure impact coordinates and velocity information relating to small arms projectiles. With the acoustic technique, acoustic targets measure a shock wave produced by a high speed projectile. By measuring the time of acoustic impact at the four corners of a target, accurate change locations may be obtained. This technique has a disadvantage in that it is sensitive to environmental changes such as changes in temperature, pressure and humidity. This technique also does not work with sub-sonic projectiles.

The impact spark technique relies on having a material in the target area that facilitates optical detection of impact points. This technique has the disadvantage of being difficult to operate outside due to ambient light.

The high speed charge coupled device (CCD) imaging technique images a target area and detects scattered light reflected off of a projectile using a CCD camera. This technique has a disadvantage in that different projectile surface types lead to different inconsistency in light reflection.

Therefore, there is a need for a target scoring system that is immune to environmental changes and that is accurate irrespective of such variables as ambient light and projectile surface type.

SUMMARY OF THE INVENTION

The disadvantages of the prior art are overcome by the present invention which, in one aspect, is a device for target scoring that includes an elongated retro-reflective member, a first light source, a second light source, a first light sensor, a second light sensor and a processor. The first light source is disposed at a first location and is spaced apart from the retro-reflective member. The first light source is also positioned so as to be able to direct a first beam of light toward the retro-reflective member. The second light source is disposed at a second location spaced apart from both the retro-reflective member and from the first light source. The second light source is also positioned so as to be able to direct a second beam of light toward the retro-reflective member so that the second beam of light intersects the first beam of light over an area so as to define a target area. The first light sensor is disposed adjacent the first light source and is positioned so as to be able to receive light from the first light source that has been reflected from the retro-reflective member. The first light sensor generates a first signal indicative of a first position of a first object sensed by blockage of illumination from the retro-reflective member. The second light sensor is disposed adjacent the second light source and is positioned so as to be able to receive light from the second light source that has been reflected from the retro-reflective member. The second light sensor generates a second signal indicative of a second position of a second object sensed by blockage of illumination from the retro-reflective member. The processor is responsive the first signal and to the second signal and is programmed to determine a location of the object in the target area, based on the first position of the first shadow and the second position of the second shadow.

In another aspect, the invention is a device for target scoring that includes an elongated lamp having a first end and a second end. A first light sensor is spaced apart from the elongated lamp and is disposed so as to be able to receive light from every point along a first portion of the elongated lamp. The first light sensor is also capable of detecting a blockage of light from a second portion of the elongated lamp. The first light sensor generates a first signal indicative of an angular position of the blockage relative to a predetermined axis. A second light sensor is spaced apart from the elongated lamp and from the first light sensor. The second light sensor is disposed so as to be able to receive light from every point along the first portion of the elongated lamp and is capable of detecting the blockage of light from the second portion of the elongated lamp. The second light sensor generates a second signal indicative of an angular position of the blockage relative to the predetermined axis. A processor that is responsive the first signal and to the second signal is programmed to determine a location of the object, based on the angular position of the blockage.

In yet another aspect, the invention is a method of determining a location of an object. A first beam of light from a first light source is directed toward a retro-reflective member. A second beam of light from a second light source is directed toward the retro-reflective member. A position of a first shadow cast by the object onto the retro-reflective member as it is illuminated by the first beam is determined. A position of a second shadow cast by the object onto the retro-reflective member as it is illuminated by the second beam is determined. The location of the object is determined by determining the point where a line from the first light source to the first shadow intersects a line from the second light source to the second shadow.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
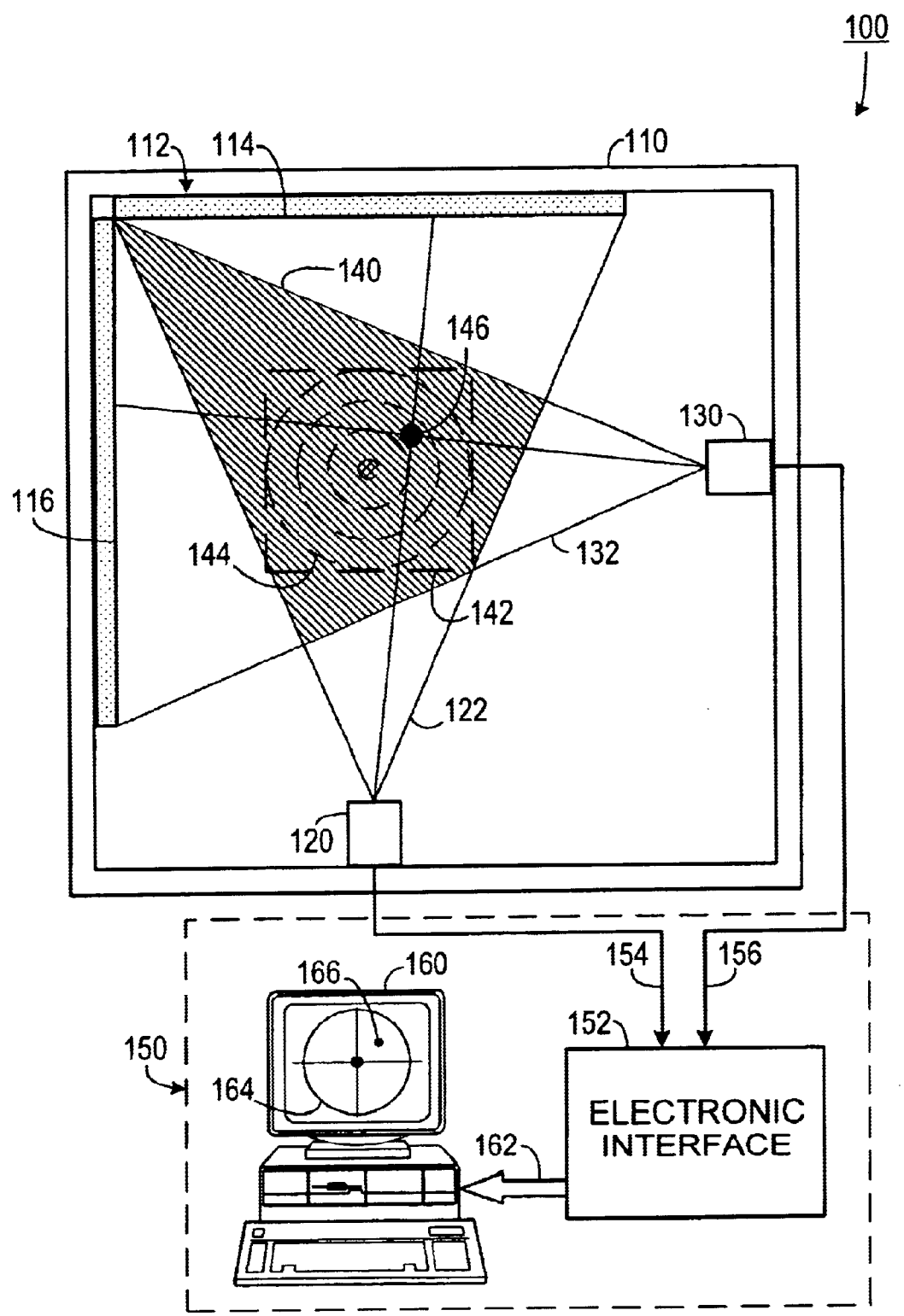
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, in one embodiment the invention is a target scoring device 100 that includes a frame 110 that supports an elongated retro-reflective member 112 which, in the example shown, includes a first reflective surface 114 disposed on a first plane and a second reflective surface 116 disposed on a second plane that intersects the first plane. As used herein, retro-reflective means having the ability to reflect a ray of light substantially in the direction of its source. The elongated retro-reflective member 112 could be-made from retro-reflective tape (such as retro-reflective tape that includes a surface upon which is deposited a plurality of glass beads—as is typically used in manufacturing traffic signs) or even a plurality of corner reflectors.

A first light source/sensor unit 120 is disposed at a first location on the frame 110 opposite from the first reflective surface 112. The first light source/sensor unit 120 is positioned so as to be able to direct a first beam 122 of light toward the first reflective surface 114 and to receive a reflection of the first beam 122 from the first reflective surface 114. The first light source/sensor unit 120 generates a first signal 154 that indicates the position of an object 146 (such as a projectile) viewed against the first reflective surface 114 illuminated by the first beam 122.

A second light source/sensor unit 130 is disposed at a second location on the frame 110 opposite from the second reflective surface 116. The second light source/sensor unit 130 is positioned so as to be able to direct a second beam 132 of light toward the second reflective surface 116 and to receive a reflection of the second beam 132 from the second reflective surface 116. The second light source/sensor unit 130 generates a second signal 156 that indicates the position of an object 146 viewed against the second reflective surface 116 illuminated by the second beam 132.

The first beam 122 intersects the second beam 132 in an overlap area 140 that defines a target area 142. An actual target 144 maybe placed behind the target area 142, so as not to block the first beam 122 or the second beam 132, thereby providing a visual reference. When one shoots at the target, the projectile 146, in going to the target 144 passes through the target area 142 and, thus, blocks a portion of the illumination from the first reflective surface 114 and the second reflective surface 116, respectively. The beams 122 and 132 are reflected back to the source/sensor units 120 and 130, respectively. The source/sensor units 120 and 130 then generate the first and second signals 154 and 156 indicative of the positions of the projectile 146 as viewed against the reflective surfaces 114 and 116, respectively.

A processor 150 is responsive the first signal and to the second signal and is programmed to determine a location of the object 146 in the target area 142, based on the views of the object 146 as sensed by the source/sensor units 120 and 130. The processor 150 includes a computer 160 and an electronic interface 152 (which may be embedded in the computer as an interface card). The interface 152 conditions the first and second signals 154 and 156 so as to be readable by the computer 160 and delivers a digital signal 162 (or combination of digital signals) that provides the computer 160 with a digital representation of the first and second signals 154 and 156. From the information in the digital signal 162, the computer 160 calculates the position of the object 146 relative to the target 144 and displays a virtual image of the projectile 166 on a virtual image of a target 164. This information may also be stored for later analysis.

In one embodiment, the processor 150 is essentially self-triggered by comparing successive data frames from the sensor unit 120. When a data frame is sensed having data that comports with an object 146 passing through the target area 142, the processor 150 begins processing data received from the sensors.

The computer 160 may be further programmed to ignore objects passing in the target area 142 at less than the velocity of an expected projectile. This would include situations in which, for example, an insect or a bird flies through the target area 142. By determining the amount of time that the object remains in the target area 142, the computer 160 can reject data corresponding to objects remaining longer than would be expected if the object 146 were a projectile. Similarly, the system can reject data corresponding to objects having dimensions different from that of an expected projectile. For example, a bird would have a greater diameter than that of a 0.45 caliber bullet. Therefore, if the system senses an illumination blockage corresponding to that of a bird, any data collected would be ignored. In this way, only meaningful data is displayed.

Figure 2A:
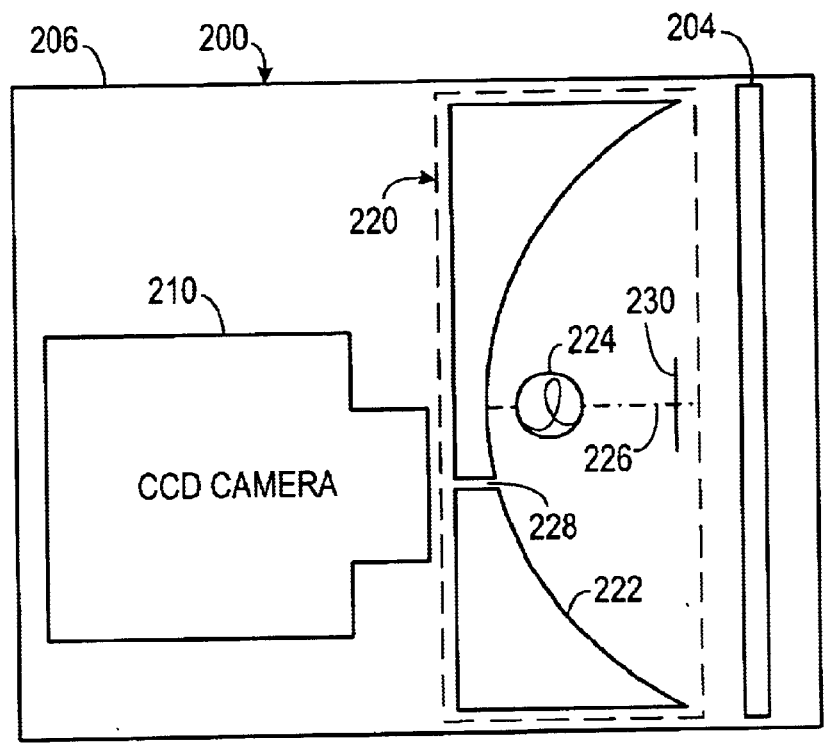
FIG. 2A is a schematic diagram of a camera/light device employed in the embodiment of FIG. 1.
Figure 2B:
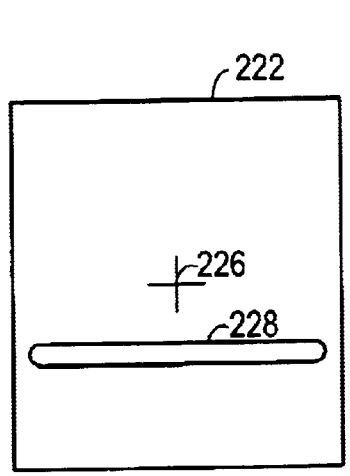
FIG. 2B is a front elevation of the reflector shown in FIG. 2A.
Figure 2C:
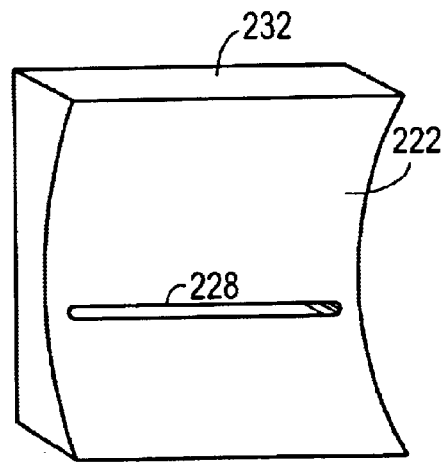
FIG. 2C is a perspective view of the reflector shown in FIG. 2B.

As shown in FIGS. 2A, 2B and 2C, a source/sensor unit 200 includes a box 206, opening on one side to a protective window 204, that houses an electronic camera 210 and an illumination unit 220. The electronic camera 210 is of the type that can capture an image of a projectile passing through a defined area. In one embodiment, the electronic camera 210 is a camera employing a charge coupled device (CCD) optical sensor.

The illumination unit 220 includes a reflector 222, a light source 224 and a deflector 230. The light source 224 could comprise an incandescent light bulb (for example, a 300W quartz halogen bulb in one embodiment) or a laser. The reflector 222 is of the type that focuses light so as to form a fan beam that runs parallel to a central axis 226 in one dimension. In the embodiment shown, the reflector is made from a block of aluminum 232 with a parabolic curved reflective surface 222. The curved reflective surface 222 has a radius of curvature and a distance from the light source 224 so that light from the light source 224 is projected onto the retro-reflective surfaces 114, 116. Machined into the aluminum block 232 is an elongated slit 228, spaced apart from the axis 226, for allowing light reflected from the first and second reflective surfaces 114, 116 to return to the electronic camera 210, which is placed coaxially with the slit 228. The reflective surface 222 is nickel plated so as to increase reflectivity. The deflector 230 is placed along the central axis 226 between the light source 224 and the window 204 to prevent light from reflecting off of the window 204 directly into the electronic camera 210. Although not shown in FIG. 2A, louvers could be added so as to extend from the window 204 to reduce the probability that sunlight would enter the electronic camera 210 and confuse the results.

Figure 3:
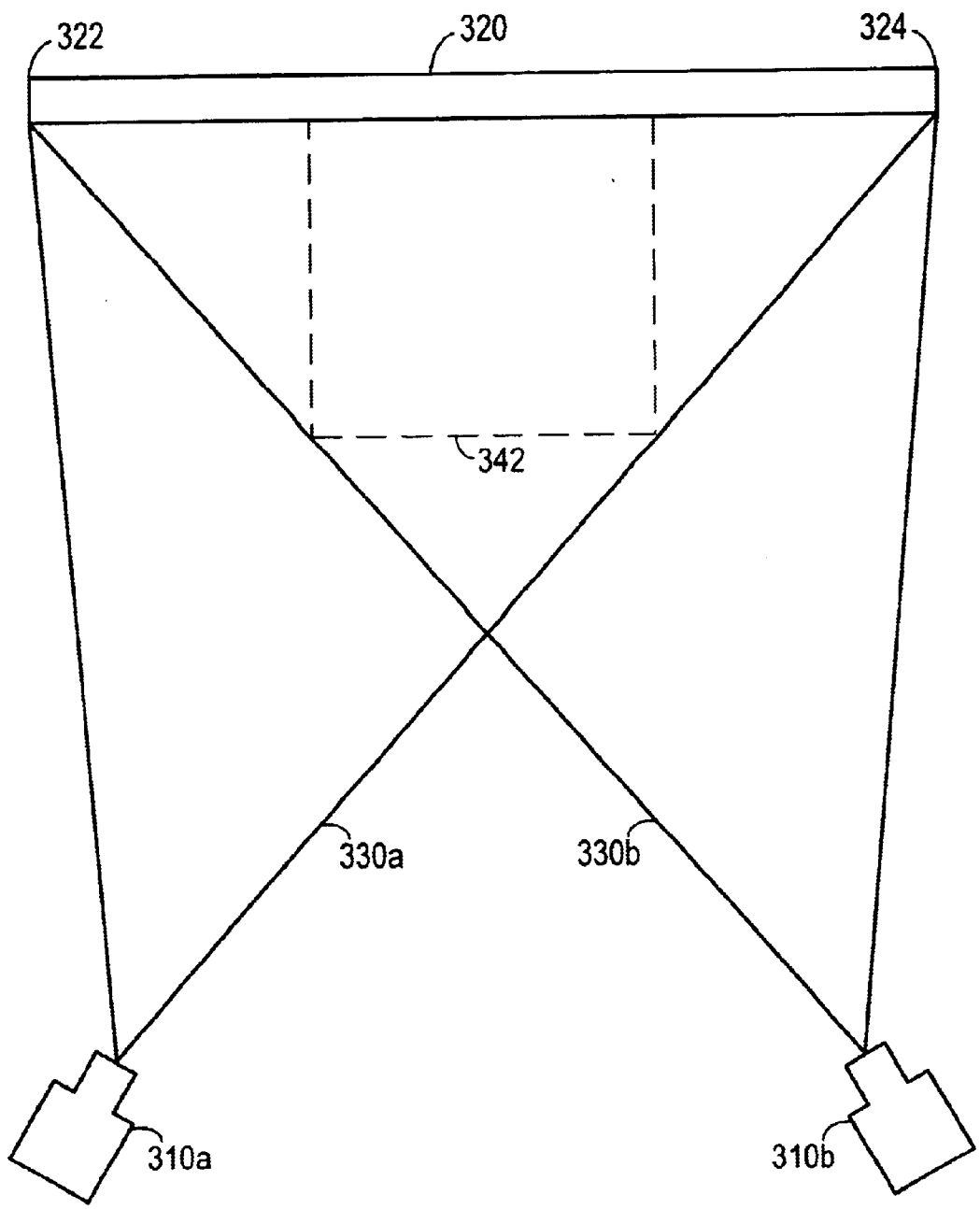
FIG. 3 is a schematic diagram of a second embodiment of the invention.

In another embodiment, as shown in FIG. 3, the invention includes an elongated lamp 320, such as a flourescent tube, having a first end 322 and a second end 324. A first light sensor 310a, spaced apart from the elongated lamp 320, is aimed so as to receive a first beam of light 330a from the elongated lamp 320. A second light sensor 310b, spaced apart from the elongated lamp 320 and from the first light sensor 310a, is also aimed so as to receive a first beam of light 330b from the elongated lamp 320. The area of overlap of the first beam 330a and the second beam 330b defines the target area 342. Signals from the first and second light sensors 330a and 330b are processed as described above with reference to FIG. 1 to detect a shadow of a projectile passing through the target area 342 and, thus, determine its location.

Figure 4:
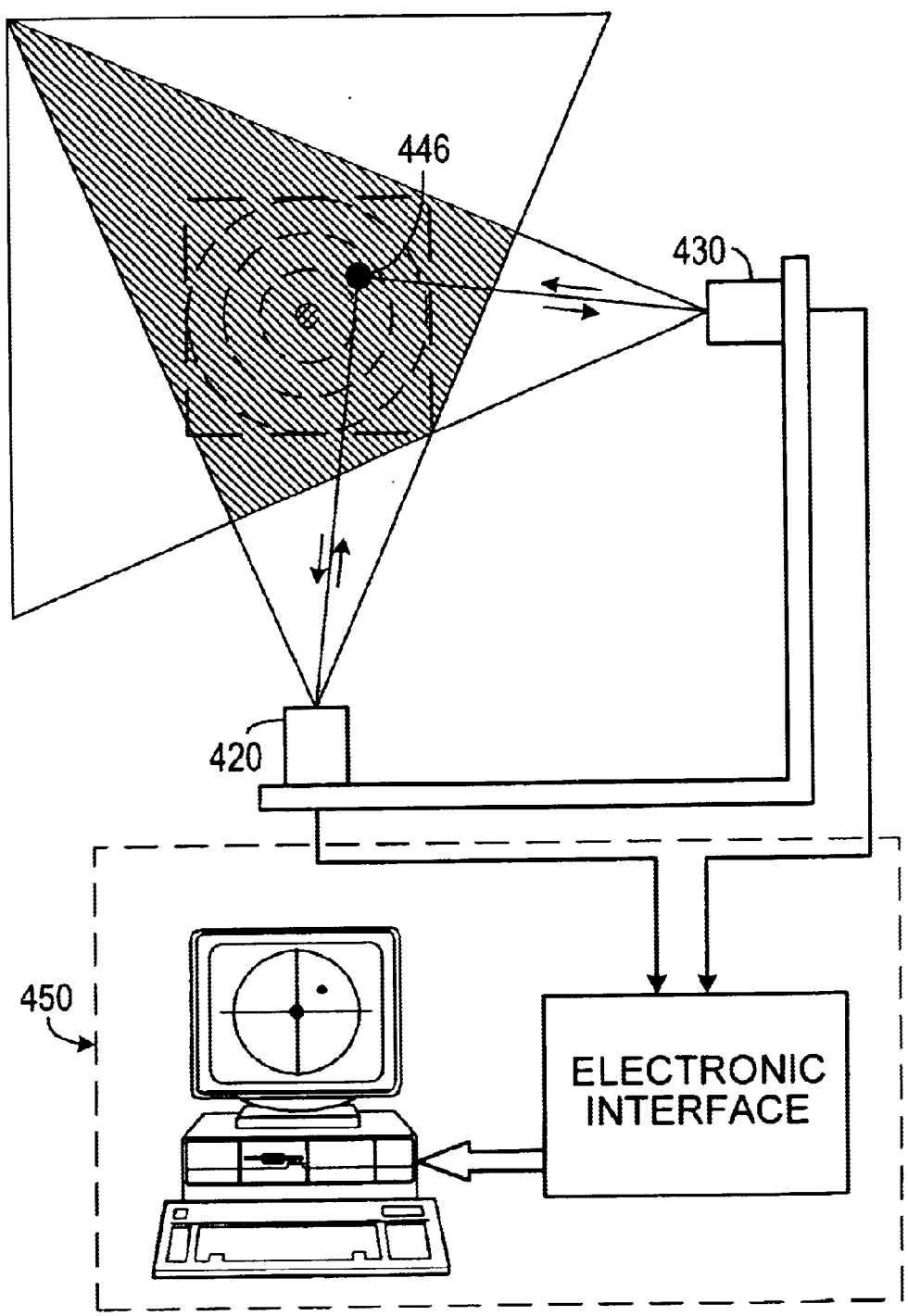
FIG. 4 is a schematic diagram of a third embodiment of the invention.

In yet another embodiment, as shown in FIG. 4, the projectile 446 may include a retro-reflective surface (e.g., such as a retro-reflective paint or tape applied to the projectile). Such an embodiment eliminates the need for the elongated retro-reflective members disclosed above. In such an embodiment, the processor is programmed to detect flashes of light corresponding to light reflections returning from the projectile 446 to the source/sensor units 420, 430.

Prior to use, the CCD camera should be calibrated to determine which pixels correspond to each angular displacement relative to the camera. This may be done in a lab by aiming a point source of light (or a point blockage of light) at the camera and moving the point source along an arc at a plurality of known angles. The response of the camera is recorded for each angle. This data, stored in the form of a look-up table, or other data storage method, is then used by the computer to determine the angle of the projectile as a function of the pixel in the camera being blocked.

Calibration of the CCD cameras in the field can be accomplished by placing a long pole with three pins extending from the pole so that the three pins extend into the target area along an axis perpendicular to the axis of the CCD camera. The distance between each pin is a known quantity and the center pin on the pole is placed at the center of the target. The CCD camera detects each pin and the computer, employing the law of sines, determines the position of the CCD camera relative to the center pin.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A device for target scoring comprising:
   a. an elongated retro-reflective member having the ability to reflect a ray of light substantially in the direction of its source;
   b. a first light source disposed at a first location spaced apart from the retro-reflective member and positioned so as to be able to direct a first beam of light toward the retro-reflective member;
   c. a second light source disposed at a second location spaced apart from both the retro-reflective member and from the first light source, the second light source positioned so as to be able to direct a second beam of light toward the retro-reflective member so that the second beam of light intersects the first beam of light over an area defining a target area;
   d. a first light sensor, disposed adjacent the first light source and positioned so as to be able to receive light from the first light source that has been reflected from the retro-reflective member, that generates a first signal indicative of a first position of a first blockage of illumination from the retro-reflective member;
   e. a second light sensor, disposed adjacent the second light source and positioned so as to be able to receive light from the second light source that has been reflected from the retro-reflective member, that generates a second signal indicative of a second position of a second blockage of illumination from the retro-reflective member; and
   f. a processor responsive the first signal and to the second signal that is programmed to determine a location of the object in the target area, based on the first position of the first blockage of illumination and the second position of the second blockage of illumination,
   wherein the processor is further programmed to ignore objects passing in the target area at less than a predetermined velocity.

2. A device for target scoring, comprising:
   a. an elongated retro-reflective member having the ability to reflect a ray of light substantially in the direction of its source;
   b. a first light source disposed at a first location spaced apart from the retro-reflective member and positioned so as to be able to direct a first beam of light toward the retro-reflective member;
   c. a second light source disposed at a second location spaced apart from both the retro-reflective member and from the first light source, the second light source positioned so as to be able to direct a second beam of light toward the retro-reflective member so that the second beam of light intersects the first beam of light over an area defining a target area;
   d. a first light sensor, disposed adjacent the first light source and positioned so as to be able to receive light from the first light source that has been reflected from the retro-reflective member, that penetrates a first signal indicative of a first position of a first blockage of illumination from the retro-reflective member;
   e. a second light sensor, disposed adjacent the second light source and positioned so as to be able to receive light from the second light source that has been reflected from the retro-reflective member, that generates a second signal indicative of a second position of a second blockage of illumination from the retro-reflective member; and
   f. a processor responsive the first signal and to the second signal that is programmed to determine a location of the object in the target area, based on the first position of the first blockage of illumination and the second position of the second blockage of illumination,
   wherein the processor is further programmed to ignore objects having a cross-sectional diameter greater than a predetermined amount.

3. A device for target scoring, comprising:
   a. an elongated retro-reflective member having the ability to reflect a ray of light substantially in the direction of its source;
   b. a first light source disposed at a first location spaced apart from the retro-reflective member and positioned so as to be able to direct a first beam of light toward the retro-reflective member;
   c. a second light source disposed at a second location spaced apart from both the retro-reflective member and from the first light source, the second light source positioned so as to be able to direct a second beam of light toward the retro-reflective member so that the second beam of light intersects the first beam of light over an area defining a target area;

d. a first light sensor, disposed adjacent the first light source and positioned so as to be able to receive light from the first light source that has been reflected from the retro-reflective member, that generates a first signal indicative of a first position of a first blockage of illumination from the retro-reflective member;

e. a second light sensor, disposed adjacent the second light source and positioned so as to be able to receive light from the second light source that has been reflected from the retro-reflective member, that generates a second signal indicative of a second position of a second blockage of illumination from the retro-reflective member; and f. a processor responsive the first signal and to the second signal that is programmed to determine a location of the object in the target area, based on the first position of the first blockage of illumination and the second position of the second blockage of illumination, wherein the processor is further programmed to ignore objects which are present within the target area for an amount of time that is greater than a first predetermined period or less than a second predetermined period.

* * * * *